US011979911B2

(12) United States Patent
Oteri et al.

(10) Patent No.: US 11,979,911 B2
(45) Date of Patent: May 7, 2024

(54) SEMI-STATIC CHANNEL ACCESS FOR TRAFFIC WITH DIFFERENT PRIORITIES

(71) Applicant: Apple Inc., Cupertino, CA (US)

(72) Inventors: Oghenekome Oteri, San Diego, CA (US); Huaning Niu, San Jose, CA (US); Weidong Yang, San Diego, CA (US); Sigen Ye, Whitehouse Station, NJ (US); Haitong Sun, Cupertino, CA (US); Chunxuan Ye, San Diego, CA (US); Chunhai Yao, Beijing (CN); Hong He, San Jose, CA (US); Wei Zeng, Saratoga, CA (US); Dawei Zhang, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/442,535

(22) PCT Filed: Oct. 16, 2020

(86) PCT No.: PCT/CN2020/121591
§ 371 (c)(1),
(2) Date: Sep. 23, 2021

(87) PCT Pub. No.: WO2022/077466
PCT Pub. Date: Apr. 21, 2022

(65) Prior Publication Data
US 2023/0239928 A1    Jul. 27, 2023

(51) Int. Cl.
*H04W 74/08* (2009.01)
*H04W 8/04* (2009.01)
(Continued)

(52) U.S. Cl.
CPC ......... *H04W 74/0825* (2013.01); *H04W 8/04* (2013.01); *H04W 74/0808* (2013.01); *H04W 74/0833* (2013.01); *H04W 74/08* (2013.01)

(58) Field of Classification Search
CPC ......... H04W 74/0825; H04W 74/0833; H04W 74/08; H04W 74/0816; H04W 8/04;
(Continued)

(56) References Cited

U.S. PATENT DOCUMENTS 10,912,150 B2 * 2/2021 Ye ..................... H04W 74/0808
11,095,409 B2 * 8/2021 Ye .......................... H04L 5/0053
(Continued)

FOREIGN PATENT DOCUMENTS

CN     105812295 A      7/2016
CN     106301733 A      1/2017
(Continued)

OTHER PUBLICATIONS

International Search Report and Written Opinion of the Internatonal Searching Authority directed to related International Patent Application No. PCT/CN2020/121591, dated Jul. 15, 2021; 8 pages.

*Primary Examiner* — Mounir Moutaouakil
(74) *Attorney, Agent, or Firm* — Sterne, Kessler, Goldstein & Fox P.L.L.C.

(57) ABSTRACT

Current 5G provisions for wireless communications do not allow for the differentiation of channel access by User Equipments (UEs) with different priorities. Approaches are described by which priority access for UEs in a controlled environment using frame based equipment (FBE), and in particular for different UEs or the same UE that has different configured grants. The approaches are particularly helpful for ultra-reliable low-latency communication (URLLC) UEs. In one approach, the UE performs a clear channel assessment (CCA) in an idle period before the fixed frame period (FFP), followed by a channel access priority test. In an alternative approach, the UE performs a channel access priority test before the UE performs a clear channel assessment (CCA) in an idle period before the fixed frame period (FFP). Other approaches include setting the fixed frame
(Continued)

period length to different sizes for each UE, using a random number of skipped fixed frame periods, and the gNB configuring UEs with multiple semi-static channel access mode parameters.

15 Claims, 10 Drawing Sheets

(51) Int. Cl.
*H04W 74/0808* (2024.01)
*H04W 74/0833* (2024.01)

(58) Field of Classification Search
CPC .............. H04W 74/0808; H04W 56/001; H04L 5/001; H04L 27/0006; H04L 5/0048; H04B 1/713
See application file for complete search history.

(56) References Cited

U.S. PATENT DOCUMENTS

| | | | | |
|---|---|---|---|---|
| 11,330,585 | B2 * | 5/2022 | Jung | H04W 48/12 |
| 2016/0302230 | A1 * | 10/2016 | Novlan | H04J 11/0023 |
| 2017/0165991 | A1 | 6/2017 | Kurasawa | |
| 2017/0353866 | A1 * | 12/2017 | Gou | H04W 74/0816 |
| 2018/0092128 | A1 * | 3/2018 | Um | H04W 74/006 |
| 2018/0192442 | A1 | 7/2018 | Li et al. | |
| 2018/0227953 | A1 * | 8/2018 | Kusashima | H04J 1/00 |
| 2018/0376494 | A1 * | 12/2018 | Hu | H04W 28/0278 |
| 2019/0380064 | A1 * | 12/2019 | Salem | H04W 74/0808 |
| 2020/0374880 | A1 * | 11/2020 | Jung | H04W 72/0453 |
| 2021/0315015 | A1 * | 10/2021 | Noh | H04W 74/0808 |

FOREIGN PATENT DOCUMENTS

| | | | |
|---|---|---|---|
| CN | 106559908 A | 4/2017 | |
| EP | 3264849 A1 * | 1/2018 | ........... H04L 1/1854 |

* cited by examiner

SEMI-STATIC CHANNEL ACCESS FOR TRAFFIC WITH DIFFERENT PRIORITIES

CROSS REFERENCE TO RELATED APPLICATIONS

The present application is a United States National Phase of International Application No. PCT/CN2020/121591, filed on Oct. 16, 2020, which is incorporated herein by reference in its entirety.

FIELD

Various aspects generally may relate to the field of wireless communications.

SUMMARY

An aspect is a method, performed by a user equipment (UE), for semi-static channel access for traffic with different priorities in a wireless communication system. The method includes performing a clear channel assessment to acquire a channel occupancy time prior to a fixed frame period. The method further includes in response to the clear channel assessment being clear, transmitting a packet within the channel occupancy time. In addition, the method includes in response to the clear channel assessment not being clear, performing a back-off procedure. The back-off procedure includes remaining quiet for a next fixed frame period; at the next fixed frame period, determining a counter value of a backoff counter; in response to determining the counter value is less than or equal to zero, setting the counter value to a random number; decrementing the counter value of the backoff counter by a fixed value to result in an updated counter value; and in response to the updated counter value being less than or equal to zero, repeat the performing the clear channel assessment.

Another aspect is a method, performed by a user equipment (UE), for semi-static channel access for traffic with different priorities in a wireless communication system. The method includes at a fixed frame period, determining a counter value of a backoff counter. The method further includes in response to determining the counter value is less than zero, performing a clear channel assessment to acquire a channel occupancy time prior to a next fixed frame period. The method also includes in response to the clear channel assessment being clear, transmitting a packet within the channel occupancy time. In addition, the method includes in response to determining the counter value is greater than zero. The method continues by including remaining quiet for the next fixed frame period. The method also includes at the next fixed frame period, determining a current value of the backoff counter. The method includes in response to determining the current counter value is less than or equal to zero, setting the counter value to a random number. Finally, the method includes decrementing the counter value of the backoff counter by a fixed value to result in an updated counter value, and repeating the performing the clear channel assessment.

Another aspect is a user equipment (UE) for semi-static channel access for traffic with different priorities in a wireless communication system. The UE includes a transceiver configured to transmit data to a network node, and processor circuitry. The processor circuitry is configured to include performing a clear channel assessment to acquire a channel occupancy time prior to a fixed frame period. The processor circuitry is further configured to in response to the clear channel assessment being clear, transmitting a packet within the channel occupancy time. In addition, the processor circuitry is further configured to in response to the clear channel assessment not being clear, performing a back-off procedure. The back-off procedure includes remaining quiet for a next fixed frame period; at the next fixed frame period, determining a counter value of a backoff counter; in response to determining the counter value is less than or equal to zero, setting the counter value to a random number; decrementing the counter value of the backoff counter by a fixed value to result in an updated counter value; and in response to the updated counter value being less than or equal to zero, repeat the performing the clear channel assessment.

Another aspect is a user equipment (UE) for semi-static channel access for traffic with different priorities in a wireless communication system. The UE includes a transceiver configured to transmit data to a network node, and processor circuitry. The processor circuitry is configured to include at a fixed frame period, determining a counter value of a backoff counter. The method further includes in response to determining the counter value is less than zero, performing a clear channel assessment to acquire a channel occupancy time prior to a next fixed frame period. The method also includes in response to the clear channel assessment being clear, transmitting a packet within the channel occupancy time. In addition, the method includes in response to determining the counter value is greater than zero. The method continues by including remaining quiet for the next fixed frame period. The method also includes at the next fixed frame period, determining a current value of the backoff counter. The method includes in response to determining the current counter value is less than or equal to zero, setting the counter value to a random number. Finally, the method includes decrementing the counter value of the backoff counter by a fixed value to result in an updated counter value, and repeating the performing the clear channel assessment.

Figure 1:
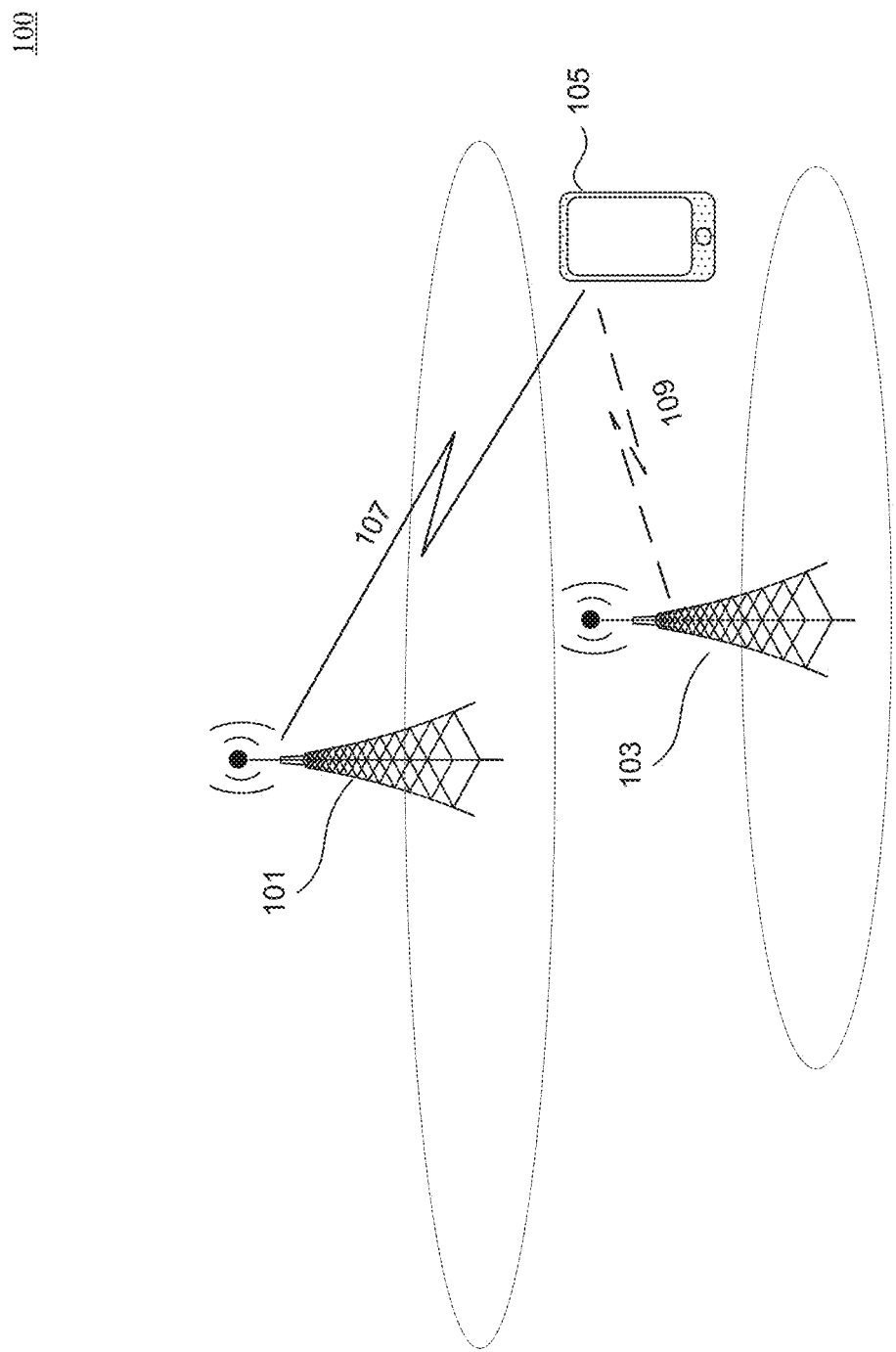
FIG. 1 illustrates an example system 100 implementing mechanisms for communications between an electronic device and a network, according to some aspects of the disclosure.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present disclosure will be described with reference to the accompanying drawings. In the drawings, like reference numbers indicate identical or functionally similar elements. Additionally, the left-most digit of a reference number identifies the drawing in which the reference number first appears.

The following Detailed Description refers to accompanying drawings to illustrate exemplary aspects consistent with the disclosure. References in the Detailed Description to "one exemplary aspect," "an exemplary aspect," "an example exemplary aspect," etc., indicate that the exemplary aspect described may include a particular feature, structure, or characteristic, but every exemplary aspect does not necessarily include the particular feature, structure, or characteristic. Moreover, such phrases do not necessarily refer to the same exemplary aspect. Further, when the disclosure describes a particular feature, structure, or characteristic in connection with an exemplary aspect, those skilled in the relevant arts will know how to affect such feature, structure, or characteristic in connection with other exemplary aspects, whether or not explicitly described.

The exemplary aspects described herein provide illustrative examples and are not limiting. Other exemplary aspects are possible, and modifications may be made to the exemplary aspects within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the aspects. Aspects may also be implemented as instructions stored on a machine-readable medium and read and executed by one or more processors. A machine-readable medium includes any mechanism for storing or transmitting information in a form readable by a machine (e.g., a computing device). For example, in some aspects a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary aspects will fully reveal the general nature of the disclosure so that others can, by applying knowledge of those skilled in relevant arts, readily modify and/or customize for various applications such exemplary aspects, without undue experimentation and without departing from the spirit and scope of the disclosure. Therefore, such modifications fall within the meaning and plurality of equivalents of the exemplary aspects based upon the teaching and guidance presented herein. Here, the phraseology or terminology serves the purpose of description, not limitation, such that the terminology or phraseology of the present specification should be interpreted by those skilled in relevant arts in light of the teachings herein.

These techniques described herein can include, but are not limited to, techniques based on 3rd Generation Partnership Project (3GPP) standards. For example, user equipment (UE) 105 can include an electronic device configured to operate using a 3GPP release, such as Release 17 (Rel-17), or other present/future 3GPP standards.

FIG. 1 illustrates an example system 100 implementing mechanisms for communication between an electronic device and a network, according to some aspects of the disclosure. Example system 100 is provided for the purpose of illustration only and does not limit the disclosed aspects. System 100 may include, but is not limited to, network nodes (for example, base stations such as eNBs, and/or gNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations) can include nodes configured to operate based on a wide variety of wireless communication techniques such as, but not limited to, techniques based on 3GPP standards.

According to some aspects, UE 105 is configured to communicate to base station 101 and/or the network associated with base station 101 (and/or 103). For example, before connecting to base station 101, UE 105 can search for a cell to attach. After completing the search, UE 105 can perform a Radio Resource Control (RRC) connection setup process. In one example, UE 105 can send an attach request to base station 101 and/or a mobility management entity (MME) (not shown) associated with base station 101. In some examples, the attach request can include an identifier of UE 105. In some aspects, if MME accepts the attach request, MME can send a setup request to, for example, base station 101. In some example, after receiving the setup request, and if base station 101 does not know the capabilities of UE 105, base station 101 can send a request to UE 105 to request the capabilities of UE 105. According to some aspects, UE 105 can send its capabilities to base station 101.

In response, base station 101 can send an RRC connection reconfiguration message back to UE 105. Then UE 105 can start data communication using base station 101.

Figure 2:
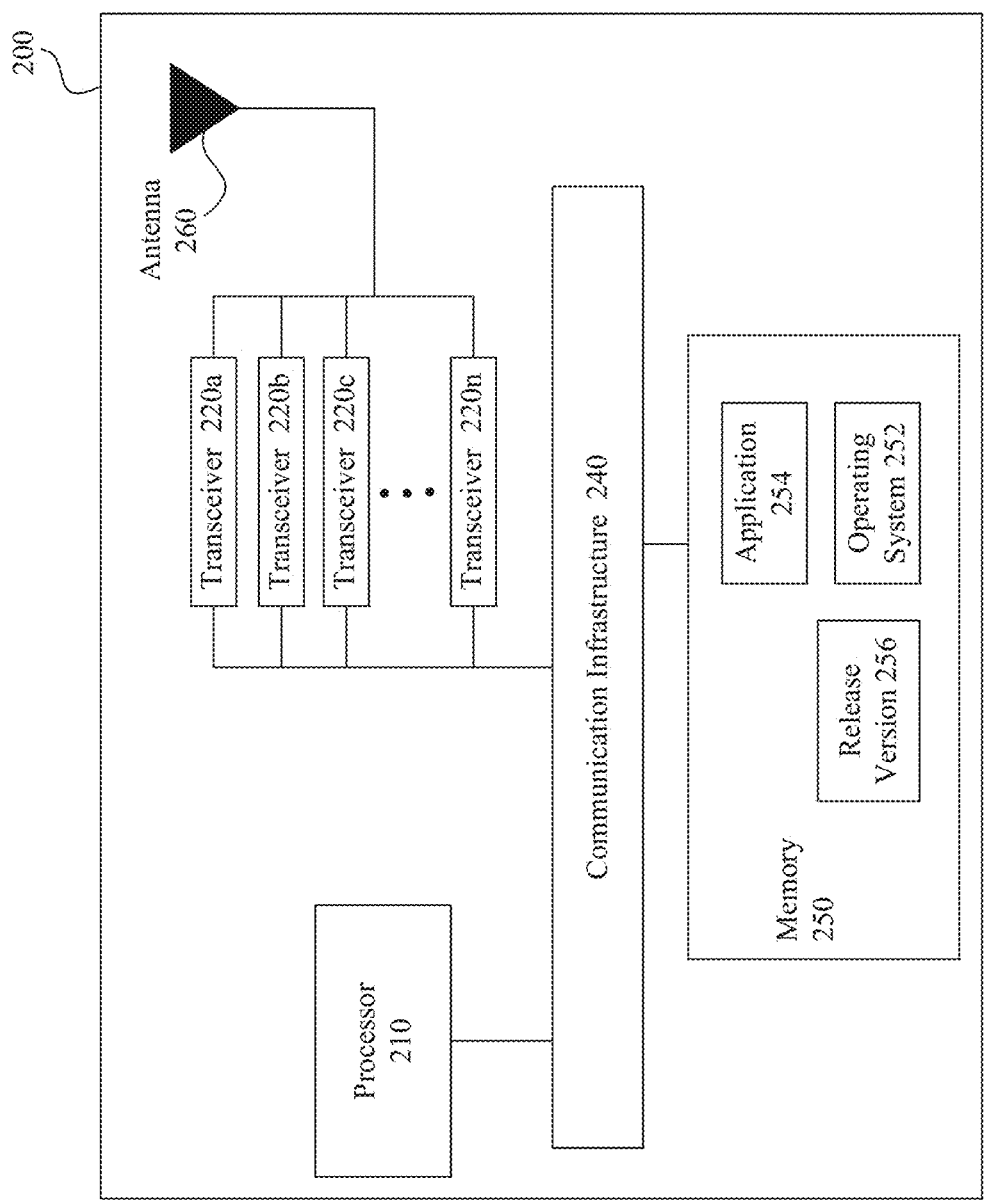
FIG. 2 illustrates a block diagram of an example system of an electronic device implementing communications, according to some aspects of the disclosure.

FIG. 2 illustrates a block diagram of an example system 200 of an electronic device implementing mechanisms for communications, according to some aspects of the disclosure. System 200 may be any of the electronic devices (e.g., base stations 101, 103, UE 105) of system 100. System 200 includes processor 210, one or more transceivers 220a-220n, communication infrastructure 240, memory 250, operating system 252, application 254, an optional release version 256, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. Processor 210 together with instructions stored in memory 250 performs operations enabling system 200 of system 100 to implement mechanisms for communication, as described herein. Additionally, or alternatively, one or more transceivers 220a-220n perform operations enabling system 200 of system 100 to implement mechanisms for communication, as described herein.

One or more transceivers 220a-220n transmit and receive communications signals that support mechanisms for communications, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220a-220n can be configured to operate according to one or more of Rel-15, Rel-16, Rel-17, or later of 3GPP standard.

According to some aspects of this disclosure, processor 210, alone or in combination with computer instructions stored within memory 250, and/or one or more transceiver 220a-220n, implements the communication approaches as discussed herein. For example, transceiver 220a can enable connection(s) and communication over a first carrier (for example, carrier 107 of FIG. 1). In this example, transceiver 220b can enable detecting and/or measuring a second carrier (for example, carrier 109 of FIG. 1), transceiver 220c can enable detecting and/or measuring a third carrier, and transceiver 220n can enable detecting and/or measuring a fourth carrier, concurrently. As discussed above, the first, second, third, and fourth carriers can be associated to same or different base stations.

Additionally, or alternatively, wireless system 200 can include one transceiver configured to operate at different carriers. Processor 210 can be configured to control the one transceiver to switch between different carriers, according to some examples.

According to some aspects of this disclosure, processor 210, alone or in combination with computer instructions stored within memory 250, and/or one or more transceiver 220a-220n, implements mechanisms for communication, as described herein. Although the operations discussed herein are discussed with respect to processor 210, it is noted that processor 210, alone or in combination with computer instructions stored within memory 250, and/or one or more transceiver 220a-220n, can implement these operations. For example, processor 210 is configured to communicate with a base station (and/or a network associated with the base station) as a per-UE capability, during an initial communication discussed above (or any other initial access). Processor 210 can use a RRC layer signaling, a medium access control (MAC) layer, and/or a physical (PHY) layer signaling to communicate as a per-UE capability. In particular, processor 210 is configured to communicate with a base station (e.g., gNB) in a semi-static channel access mode using a channel occupancy time in a fixed frame period (FFP) associated with the UE.

The global wireless standards body 3GPP continues to develop and standardize enhancements to wireless communications in support of various use cases that reflect an inexhaustible number and variety of wireless devices that seek to communicate massive amounts of data. Part of this development timeline includes 5G with its expected improvements for higher throughputs and capacity and lower latencies, as well as the ability to specify a flexible system that supports a wide variety of use cases with very different requirements (e.g., from low-end machine type communication (MTC) to the high-end virtual reality mobile broadband (MBB)).

Insight by the inventors identified novel enhancements to ensure 5G feature compatibility with unlicensed band ultra-reliable low-latency communication/internet of things (URLLC/IoT) operation in controlled environments. In some embodiments, the IoT operations are industrial Iot (IIoT) operations. In identifying these enhancements, it was recognized that such enhancements would need to work within the following limitations of the environments. For example, in a semi-static channel access mode, if sensing is needed, the sensing is performed immediately before the configured/scheduled transmission opportunity. In addition, for operation with semi-static channel access, the random starting offsets for UL configured grants with full bandwidth allocation when UE initiates a channel occupancy time (COT), are not supported.

Additional considerations are as follows. A UE initiates a COT in a frame fixed period (FFP) associated with the UE, if the UE transmits a UL transmission burst starting at the beginning of the FFP and ending at any symbol before the idle period of the FFP after a successful clear channel assessment (CCA) of 9 μs immediately before the UL transmission burst. UE-to-gNB COT sharing in semi-static channel access mode is supported.

The gNB determines a COT in an FFP associated to a UE, that is initiated by the UE, if the gNB detects a UL transmission from the UE starting from the beginning of the FFP and ending before the idle period of the FFP.

For a semi-static channel access mode, a start of FFP for UE-initiated COT can be different from the start of FFP for gNB-initiated COT. In frame based equipment (FBE) gNB operations, once can perform a CCA using energy detect to acquire COT with Cat-2 immediately prior to the fixed frame period. If clear, one can transmit with a COT (no need to re-evaluate during this period) in a range between 1 ms and 10 ms. This COT is followed by an idle time that is greater than 5% of COT. If not clear, one would remain quiet for the next fixed frame period. Typically, a CCA is performed once every fixed frame period. A gNB operation is permitted to grant an authorization to one or more UEs to transmit within the current COT.

For UE transmissions within a gNB-initiated COT, if a gap is less than or equal to 16 μs, a Cat-1 procedure may be used by responding device for transmission (i.e. immediate transmission) within the acquired COT. If a gap is greater than 16 μs, a Cat-2 procedure should be used.

Figure 3:
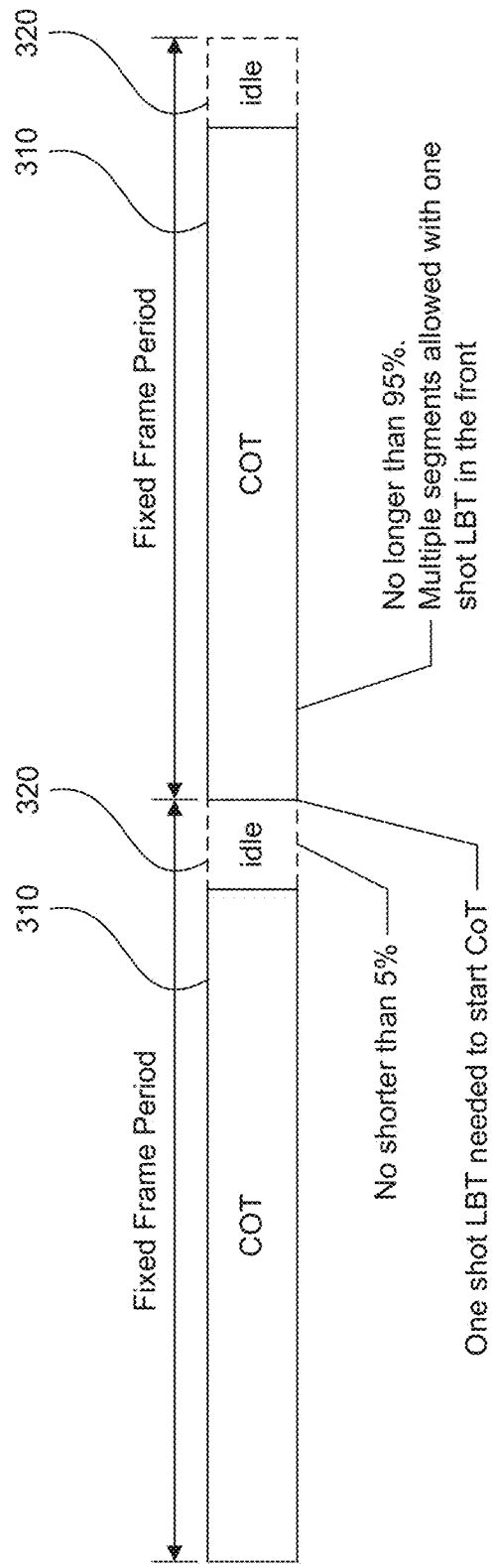
FIG. 3 illustrates the usage of a fixed frame period, in accordance with embodiments of the present disclosure.

FIG. 3 illustrates the usage of a fixed frame period, in accordance with embodiments of the present disclosure. The fixed frame period includes a channel occupancy time (COT) 310 and an idle period 320. Idle period 320 is no shorter than 5% of the fixed frame period. Consequently, COT 310 is no longer than 95% of the fixed frame period. A listen before talk (LBT) is needed to start a COT 310. Multiple segments within COT 310 are permitted with one LBT prior to COT 310.

In various embodiments, the FFP configuration is included in SIB-1. The FFP configuration can be signaled for a UE with UE-specific RRC signaling. The fixed frame period is restricted to values of the following set of values{1 ms, 2 ms, 2.5 ms, 4 ms, 5 ms, 10 ms}, where these values include the idle period.

The starting positions of the FFPs within every two radio frames starts from an even radio frame and are given by i*P where i={0, 1, . . . , 20/P−1} where P is the fixed frame period in ms. The idle period for a given SCS=ceil(Minimum idle period allowed by regulations/Ts) where minimum idle period allowed=max(5% of FFP, 100 μs), Ts is the symbol duration for the given SCS. It is noted that the offset does not need to be signaled via RRC.

It is noted that UE transmissions within a FFP can occur if DL signals/channels (e.g., PDCCH, SSB, PBCH, RMSI, GC-PDCCH, . . . ) within the FFP are detected. Frame Based Equipment (FBE) shall implement a Listen Before Talk (LBT) based Channel Access Mechanism to detect the presence of other RLAN transmissions on an Operating Channel.

Frame Based Equipment is equipment where the transmit/receive structure has a periodic timing with a periodicity equal to the Fixed Frame Period. A single Observation Slot as defined in clause 3.1 and as referenced by the procedure in clause 4.2.7.3.1.4 in the 3GPP specifications shall have a duration of not less than 9 μs.

A device that initiates a sequence of one or more transmissions is denoted as the Initiating Device. Otherwise, the device is denoted as a Responding Device. Frame Based Equipment may be an Initiating Device, a Responding Device, or both.

It is noted that in RAN1 #102-e of the 3GPP working groups, the following agreement was made: for semi-static channel access mode, if sensing is needed, it is performed immediately before the configured/scheduled transmission opportunity.

For operation with semi-static channel access, the 3GPP Rel-16 random starting offsets for UL configured grants with full BW allocation when UE initiates a COT, is not supported. Existing FFP access in R16 of the 3GPP specifications requires CAT-2 access before an FFP. This does not allow differentiation between channel access with different priorities.

Recognizing the above, the inventors considered the problem of how to enable priority access for UEs in a controlled environment using FBE especially for URLLC UEs. At least two categories are discussed below. In the first category, solutions are described for scenarios involving different UEs. In the second category, a solution is described for scenarios involving the same UE, e.g., where the same UE has two or more different configured grants.

The first category of solutions involves different UEs with different traffic priorities. In the first group of solutions for this category, a UE performs a CCA in an idle period before a FFP. Then, the UE performs a channel access priority test to decide if the UE is eligible to transmit. If both of these tests by the UE is successful, then the UE transmits. There are three different solutions within this first group of solutions for this first category. The first solution employs a random backoff approach that uses a virtual backoff counter that is triggered in the case of a CCA failure. The second solution employs a random backoff approach that uses a virtual backoff counter that is triggered in the case of a CCA success (i.e., the opposite of the first solution). The third solution employs a probability-based channel access priority test after a successful CCA test. All three solutions in the first category of solutions perform a CCA test initially.

In the second group of solutions for this category, the first step is not to perform a CCA test. Instead, in this group of solutions, the UE performs channel access priority test to decide if it should perform a CCA test. Then, the UE performs a CCA test in the idle period before FFP. If both tests are successful, then the UE transmits. There are two solutions within this group of solutions. The first solution employs a counter-based channel access priority test before proceeding with any CCA test. The second solution employs a probability-based channel access priority test before any CCA test.

Other solutions contemplated by the inventors include a solution in which the FFP length set to different sizes for each UE. In another solution, a random number of skipped FFPs are used.

Finally, the inventors also devised a solution to scenarios in which the same UE has different traffic priorities. In the proposed solution, the gNB configures UE with multiple semi-static channel access mode parameter.

Random Backoff Using a Virtual Backoff Counter in Case of CCA Failure

In further embodiments, an approach is described for addressing the situation in which different UEs have different traffic priorities. In this embodiment, a random backoff using a virtual backoff counter is conducted after a CCA test failure. In an embodiment, a CCA is performed using energy detect to acquire COT with Cat-2 immediately prior to the fixed frame period. This solution has a number of options that may allow an FFP to have multiple sub-allocations (i.e., RBsets). In one of these options, the UE may perform a CCA per RBset. In another of these options, a UE may perform a CCA on the entire LBT band. In these options, it is noted that UEs using the RBset framework may need to have the same FFP period.

Figure 4:
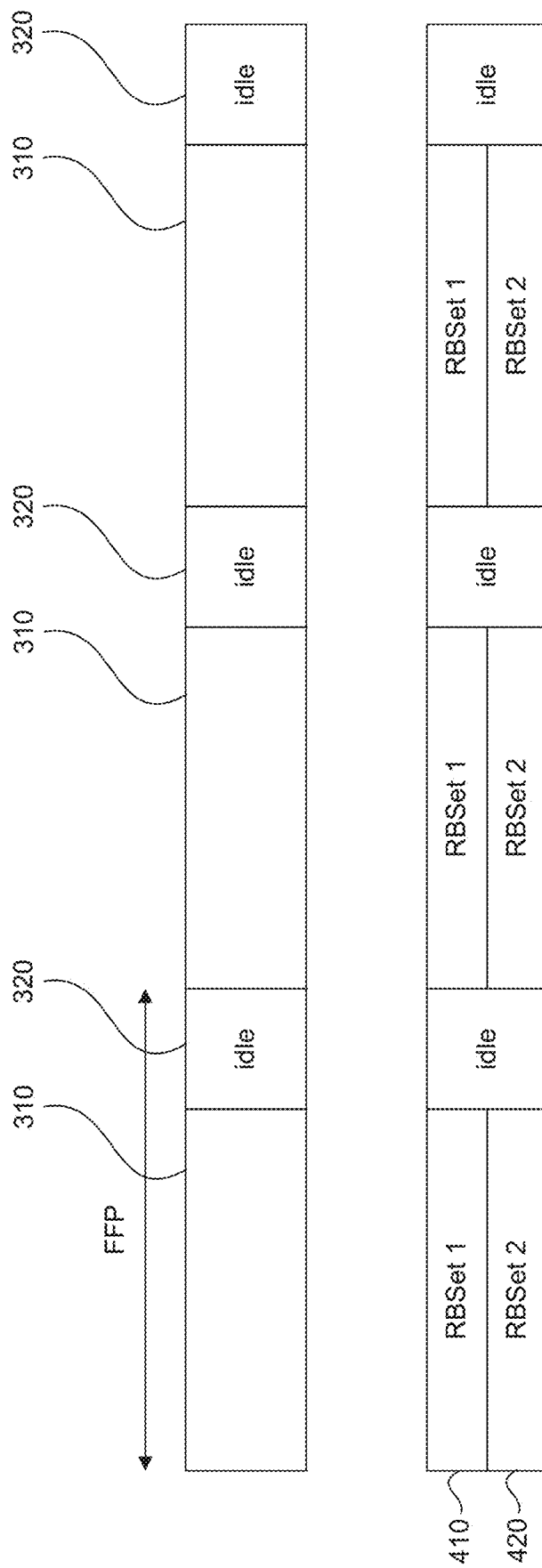
FIG. 4 illustrates the usage of a fixed frame period in an RB Set framework, in accordance with embodiments of the present disclosure.

FIG. 4 illustrates the usage of a fixed frame period in an RB Set framework, in accordance with embodiments of the present disclosure. The fixed frame period includes a channel occupancy time (COT) 310 and an idle period 320. During COT 310, two or more RBSets may be used. For example, RBSet 1 (410) and RBSet 2 (420) may be used during COT 310.

Returning to the CCA test implications, if the CCA test is clear, the UE can transmit within a COT duration. In an embodiment the COT duration is between 1 ms and 10 ms. It is noted that there is no need to re-evaluate during this period. Following the COT duration, there is an idle time that is greater than 5% of COT. In this solution, various possibilities apply. First, in the case of an exponential back-off, Bmax is equal to Bmin. Second, the UE may transmit on a randomly selected RBset, if the RBset is enabled. Third, the UE may transmit on a specifically identified RBset, if the RBset is enabled.

Returning to the CCA test implications, if the CCA test is not clear or if X>0, the UE will remain quiet for next FFP. At FFP_index+1, the UE checks the virtual backoff counter X. If X<=0, X can be determined by using a virtual backoff counter to generate a random number (X) that is between [0, B] where B is set between Bmin and Bmax. Otherwise, one should use the existing (frozen) value of X. Bmin and Bmax are values determined by the priority of the traffic for the UE. Note that the virtual back-off counter generation can take place immediately after a successful transmission discussed in the preceding paragraph.

Next, X is decremented by a fixed value Y to become X_new. In this step, X can be decremented by 1. In another embodiment of this step, X can be decremented by a fixed value signaled to the UE by the gNB. For example, the fixed value could be based on the UE's traffic priority. In another embodiment of this step, X can be decremented based on the number of possible frequency resources the UE may be allowed to access N, e.g., {FFP, RBset1}, {FFP, RBset2}, ..., {FFP, RBsetN}.

If X_new<=0, then go back to the first step, i.e., redo the CCA test. Otherwise, go back to the steps that are in response to a CCA test that shows the channel is not clear. Note that in the case of an exponential back-off, Bmax may be set to 2*Bmax.

Finally, in this solution, CCA is performed once every valid fixed frame period.

Figure 5:
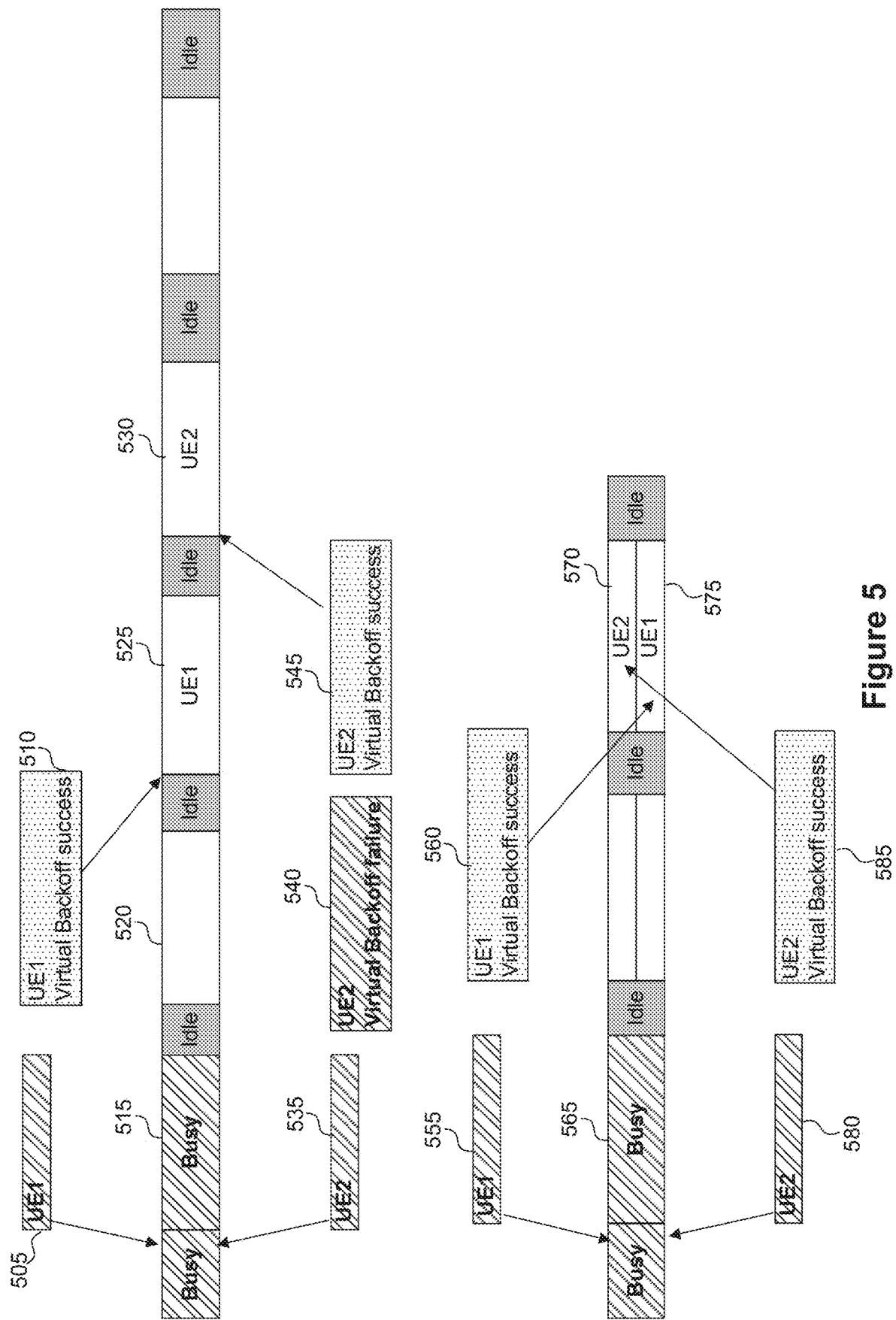
FIG. 5 illustrates the backoff approach, in accordance with embodiments of the present disclosure.

FIG. 5 illustrates the backoff approach, in accordance with embodiments of the present disclosure. The fixed frame period includes a channel occupancy time (COT) 515 that is busy. COT 520, 525 and 530 are not busy. UE1 505 checks with a CCA test whether the channel is busy. In this test, it finds that COT 515 is busy, and backs off its counter. When it checks again based on the backoff counter, it finds that COT 525 is clear (virtual backoff failure 510) and transmits during COT 525. UE2 535 checks with a CCA test whether the channel is busy. In this test, it finds that COT 515 is busy, and backs off its counter. When it checks again based on the backoff counter, it finds that COT 525 is not clear (virtual backoff failure 540) because UE1 has occupied COT 525. When it checks yet again based on the backoff counter, it finds that COT 530 is clear (virtual backoff success 545) and transmits during COT 530.

In another scenario, the fixed frame period includes a channel occupancy time (COT) 565 that is busy. RBSets 570 and 575 in a subsequent COT are not busy. UE1 555 checks with a CCA test whether the channel is busy. In this test, it finds that COT 565 is busy, and backs off its counter. When it checks again based on the backoff counter, it finds that RBSet 575 in a subsequent COT is clear (virtual backoff success 560) and transmits using RBSet 575. UE2 580 checks with a CCA test whether the channel is busy. In this test, it finds that COT 565 is busy, and backs off its counter. When it checks again based on the backoff counter, it finds that RBSet 570 in a subsequent COT is clear (virtual backoff success 585) and transmits using RBSet 570.

Random Backoff Using a Virtual Backoff Counter in Case of CCA Success

In further embodiments, an approach is described for addressing the situation in which different UEs have different traffic priorities. In this embodiment, a random backoff using a virtual backoff counter in used in the case of CCA success. First, the UE performs a CCA using energy detect to acquire COT with Cat-2 immediately prior to the fixed frame period. This solution has a number of options that may allow an FFP to have multiple sub-allocations (i.e., RBsets). In one of these options, the UE may perform a CCA per RBset. In another of these options, a UE may perform a CCA on the entire LBT band. In these options, it is noted that UEs using the RBset framework may need to have the same FFP period. If the CCA test is not clear, the UE should remain quiet for the next FFP, and return to the first step of performing the CCA.

Figure 6:
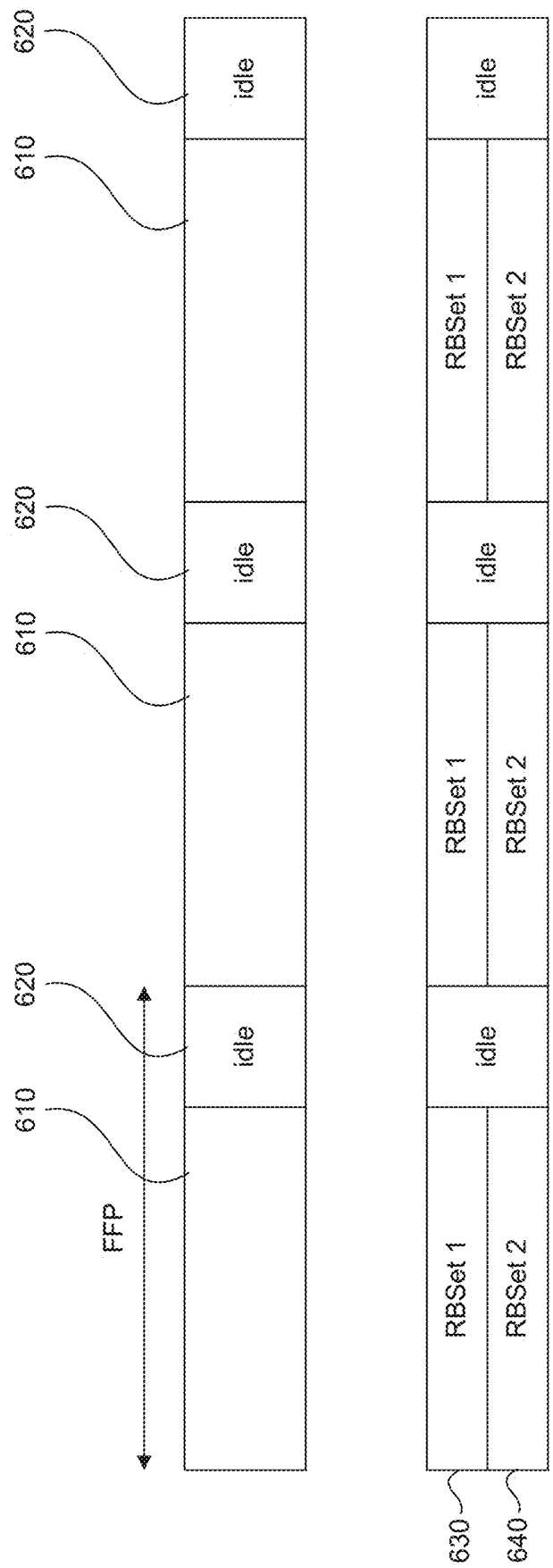
FIG. 6 illustrates the usage of a fixed frame period in an RB Set framework, in accordance with embodiments of the present disclosure.

FIG. 6 illustrates the usage of a fixed frame period in an RB Set framework, in accordance with embodiments of the present disclosure. The fixed frame period includes a channel occupancy time (COT) 610 and an idle period 620. During COT 610, two or more RBSets may be used. For example, RBSet 1 (630) and RBSet 2 (640) may be used during COT 610.

If the CCA test is clear, the virtual backoff counter X should be checked. Next, X is decremented by a fixed value Y to become X_new. In one embodiment of this step, X can be decremented by 1. In another embodiment of this step, X can be decremented by a fixed value signaled to the UE by the gNB. For example, the fixed value could be based on the UE's traffic priority. In another embodiment of this step, X can be decremented based on the number of possible frequency resources the UE may be allowed to access N, e.g., {FFP, RBset1}, {FFP, RBset2}, ..., {FFP, RBsetN}.

If X_new<=0, then the UE is allowed to transmit. X for the next channel access is determined by using a virtual backoff counter to generate a random number (X) that is between [0, B] where B is set between Bmin and Bmax. Otherwise, one should use the existing (frozen) value of X. Bmin and Bmax are values determined by the priority of the traffic for the UE. the UE can transmit within a COT duration.

In an embodiment the COT duration is between 1 ms and 10 ms. It is noted that there is no need to re-evaluate during this period. Following the COT duration, there is an idle time that is greater than 5% of COT. In this solution, various possibilities apply. First, the UE may transmit on a randomly selected RBset, if the RBset is enabled. Second, the UE may transmit on a specifically identified RBset, if the RBset is enabled. If X_new<=0, then go back to the first step, i.e., redo the CCA test. Otherwise, go back to the step to check the virtual backoff counter X In the final step, if X>0, the UE should remain quiet for the next FFP, and then go back to the first step of the procedure.

Probability-Based Channel Access Priority Test after Successful CCA

In further embodiments, an approach is described for addressing the situation in which different UEs have different traffic priorities. In this embodiment, the probability-based channel access priority test is conducted after a successful CCA test. In an embodiment, a CCA is performed using energy detect to acquire COT with Cat-2 immediately prior to the fixed frame period. If the CCA test is clear, the UE performs channel access priority test to decide if it is eligible to transmit. In an embodiment, the UE generates a random variable with a success probability p, e.g. a uniform random variable (v), between 0 and 1. In an embodiment, it should be noted that p can configured to a fixed value or p can modified based on the success/failure of the COT access. If the variable v is successful, i.e., if v>p, then the UE performs a CCA using energy detect to acquire COT with Cat-2 immediately prior to the fixed frame period. If the CCA is clear, the UE can transmit within a COT duration. In an embodiment the COT duration is between 1 ms and 10 ms. It is noted that there is no need to re-evaluate during this period. Following the COT duration, there is an idle time that is greater than 5% of COT.

If not clear or if the variable is not successful (e.g. v<p), the UE remains quiet for the next 1 fixed frame period. The value of p can be set based on the traffic priority of UE.

Counter-Based Channel Access Priority Test Before any CCA

In further embodiments, an approach is described for addressing the situation in which different UEs have different traffic priorities. In this embodiment, a counter-based channel access priority test is conducted before any CCA. The UE checks a virtual backoff counter to determine whether to perform CCA. For example, at a new FFP, the virtual backoff counter (X) is checked. If X<0, then perform CCA. In an embodiment, a CCA is performed using energy detect to acquire COT with Cat-2 immediately prior to the fixed frame period. Such an approach may allow an FFP to have multiple sub-allocations (RBsets). Various alternatives are permissible in this approach. In a first alternative, the UE may perform CCA per RBset. In another alternative, the UE may perform CCA on entire LBT band. It is important to note that UEs using an RBSet framework may need to have same FFP period.

If the result of the CCA check is clear, the UE may transmit within a COT duration. In an embodiment the COT duration is between 1 ms and 10 ms. It is noted that there is no need to re-evaluate during this period. Following the COT duration, there is an idle time that is greater than 5% of COT.

It is noted that in the case of exponential back-off, Bmax=Bmin.

It is noted that the UE may transmit on a randomly selected RBset if RBset framework is enabled. It is further noted that the UE may transmit on a specifically identified RBset if RBset framework is enabled.

If X>0, the UE will remain quiet for next FFP.

At FFP_index+1, the UE checks the virtual backoff counter X.

If X<=0, X can be determined by using a virtual backoff counter to generate a random number (X) that is between [0, B] where B is set between Bmin and Bmax. Otherwise, one should use the existing (frozen) value of X. Bmin and Bmax are values determined by the priority of the traffic for the UE. In another embodiment, another input X can be fixed to have a specific value. In a further embodiment, the value of X can be a randomly generated back-off counter.

Decrement X by a fixed value Y, to X_new. It is noted that X may not be decremented if UE transmitted in previous FFP. In one embodiment of this approach, X can be decremented by 1. In another embodiment of this approach, X can be decremented by a fixed value signaled to the UE by the gNB, e.g., based on the UE's traffic priority. In a further embodiment of this approach, X can be decremented based on the number of possible frequency resources the UE may be allowed to access N e.g. {FFP, RBset1}, {FFP, RBset2}, . . . , {FFP, RBsetN}

Upon completion, the procedure goes back to step 1.

Probability-Based Channel Access Priority Test Before any CCA

In further embodiments, an approach is described for addressing the situation in which different UEs have different traffic priorities. In this embodiment, a probability-based channel access priority test takes place before any CCA. Here, the UE performs channel access priority test to decide if it is eligible to perform CCA. In an embodiment, the UE generates a random variable with a success probability p, e.g. a uniform random variable (v), between 0 and 1. In an embodiment, it should be noted that p can configured to a fixed value or p can modified based on the success/failure of the COT access. If the variable v is successful, i.e., if v>p, then the UE performs a CCA using energy detect to acquire COT with Cat-2 immediately prior to the fixed frame period. If the CCA is clear, the UE can transmit within a COT duration. In an embodiment the COT duration is between 1 ms and 10 ms. It is noted that there is no need to re-evaluate during this period. Following the COT duration, there is an idle time that is greater than 5% of COT.

In some embodiments, the UE may transmit on a randomly selected if RBset framework is enabled. In other embodiments, the UE may transmit on a specifically identified RBset if RBset framework is enabled. The UE may transmit within a COT duration. In an embodiment, the COT duration is between 1 ms and 10 ms. It is again noted that there is no need to re-evaluate during this period. Following the COT duration, there is an idle time that is greater than 5% of COT. If the CCA is not clear, the UE will remain quiet for the next 1 fixed frame period If the variable v is not successful, i.e., if v is not greater than p, the UE remains quiet for X FFP periods. X is an integer than can be set based on an input. In one embodiment, the input could be the traffic priority of the UE, i.e., X can be set based on traffic priority of UE. For example, in one embodiment, X can be determined by using a virtual backoff counter to generate a random number (X) that is between [0, B] where B is set between Bmin and Bmax. Bmin and Bmax are values determined by the priority of the traffic for the UE. In another embodiment, another input X can be fixed to have a specific value. In a further embodiment, the value of X can be a randomly generated back-off counter.

FFP Length Set to Different Sizes for Each UE

In further embodiments, an approach is described for addressing the situation in which different UEs have different traffic priorities. In this embodiment, the FFP length set to different sizes for each UE. In one of these embodiments, a smaller FFP length is assigned to UEs with higher traffic priority. Here, the FFP procedure identical to baseline Rel-16. In this regard, the FFP procedure identical to option 1, i.e., both FFP length and random number of skipped FFPs.

Random Number of Skipped FFPs

In further embodiments, an approach is described for addressing the situation in which different UEs have different traffic priorities. In this embodiment, the approach uses a random number of skipped FFPs. In one embodiment, one performs a CCA using energy detect to acquire COT with Cat-2 immediately prior to the fixed frame period. If the result of the CCA is clear, one can transmit with a COT. In an embodiment, the COT can be in the range of 1 ms and 10 ms. During this period, there is no need to re-evaluate during this period. In this embodiment, the COT is followed by an idle time of greater than 5% of the COT.

Figure 7:
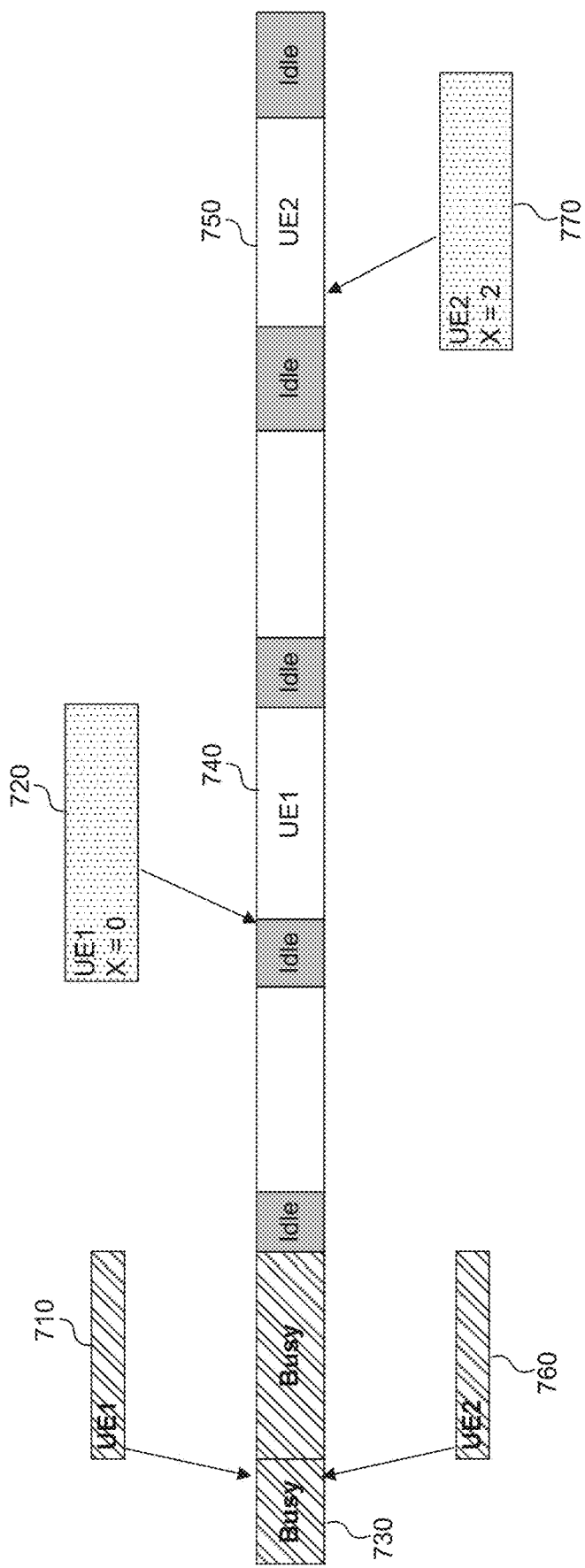
FIG. 7 illustrates the backoff approach, in accordance with embodiments of the present disclosure.

If the result of the CCA is not clear, then the UE should remain quiet for the next X fixed frame periods. X is an integer than can be set based on an input. One input could be the traffic priority of the UE, i.e., X can be set based on traffic priority of UE. In another embodiment, another input X can be fixed to have a specific value. In a further embodiment, the value of X can be a randomly generated back-off counter.

generate virtual backoff counter as a random number X between [0, B] where B is set between Bmin and Bmax. Bmin and Bmax are determined by the priority of the traffic for the UE. It is noted that CCA is performed once every fixed frame period FIG. 7 illustrates the backoff approach, in accordance with embodiments of the present disclosure. The fixed frame period includes a channel occupancy time (COT) 730 that is busy. COT 740 and 750 are not busy. UE1 710 checks with a CCA test whether the channel is busy. In this test, it finds that COT 730 is busy, and backs off its counter. When it checks again based on the backoff counter (with an X=0), it finds that COT 740 is clear (UE1 with X=0 (720)) and transmits during COT 740. UE2 760 checks with a CCA test whether the channel is busy. In this test, it finds that COT 730 is busy, and backs off its counter. When it checks again based on the backoff counter (with an X=2), it finds that COT 750 is clear (UE2 with X=2 (730)) and transmits during COT 750.

gNB Configures UE with Multiple Semi-Static Channel Access Mode Parameters

In further embodiments, an approach is described for addressing the situation in which the same UE has different traffic priorities. In this embodiment, the gNB configures UE with multiple semi-static channel access mode parameters. In one embodiment, multiple values of Bmin, Bmax, and Y are used. In another embodiment, multiple values of X and p are used. In a further embodiment, multiple FFP lengths may be used. In this embodiment, two alternatives are possible. In one alternative, the gNB may configure a fixed pattern in which the FFP lengths are transmitted. In the other alternative, the gNB may allow UE to select optimal pattern based on traffic needs. In this second alternative, FFP lengths may be nested. In this approach, the UE may signal the FFP length it is using when it transmits.

These approaches can be further described in two scenarios. In the first scenario, the UE has traffic available for transmission at priority 1 (associated with p1) and priority 2 (associated with p2), the UE generates v1 and tests v1 against p1 (v1<=p1), and generates v2 and has it tested against p2 (v2<=p2). If either one is valid, then the UE can transmit a packet.

In the second scenario, the UE has traffic available for transmission at priority 1 (associated with p1) and priority 2 (associated with p2). The UE is allowed to choose the test for one priority only: either priority 1 or priority 2. In this case, a single random experiment is done. Depending on the outcome of the experiment, the UE can transmit a packet.

Figure 8:
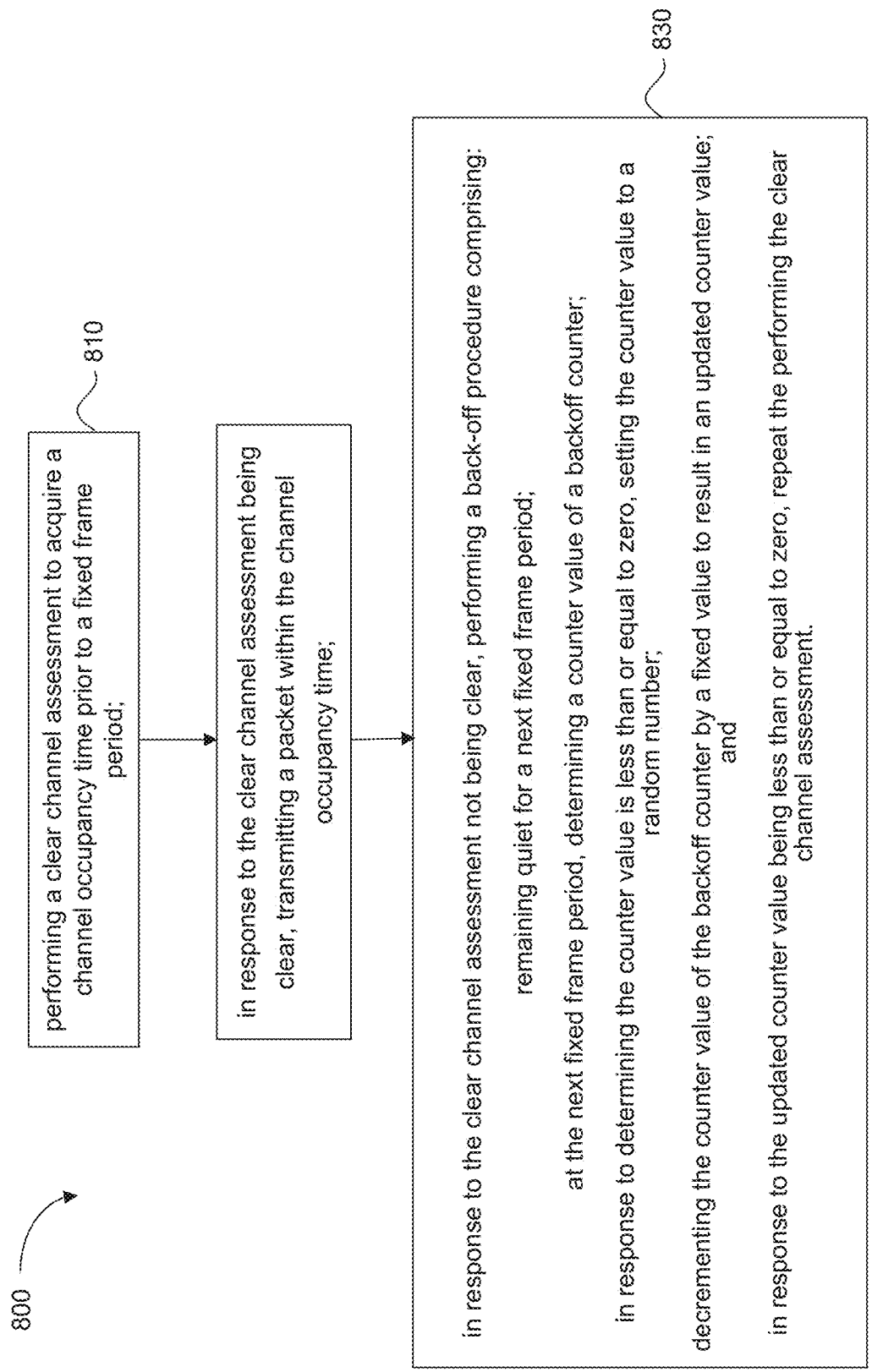
FIG. 8 illustrates a flowchart diagram of a method 800 for semi-static channel access for traffic with different priorities by a user equipment (UE) in a wireless communication system, in accordance with embodiments of the present disclosure.

FIG. 8 illustrates a flowchart diagram of a method 800 for semi-static channel access for traffic with different priorities by a user equipment (UE) in a wireless communication system. The method includes the following steps. Step 810 of the method includes the step of performing a clear channel assessment to acquire a channel occupancy time prior to a fixed frame period. Step 820 of the method includes the step of in response to the clear channel assessment being clear, transmitting a packet within the channel occupancy time. Step 830 of the method includes the step of in response to the clear channel assessment not being clear, performing a back-off procedure. The back-off procedure comprises the following sub-steps: remaining quiet for a next fixed frame period; at the next fixed frame period, determining a counter value of a backoff counter; in response to determining the counter value is less than or equal to zero, setting the counter value to a random number; decrementing the counter value of the backoff counter by a fixed value to result in an updated counter value; and in response to the updated counter value being less than or equal to zero, repeat the performing the clear channel assessment.

Figure 9:
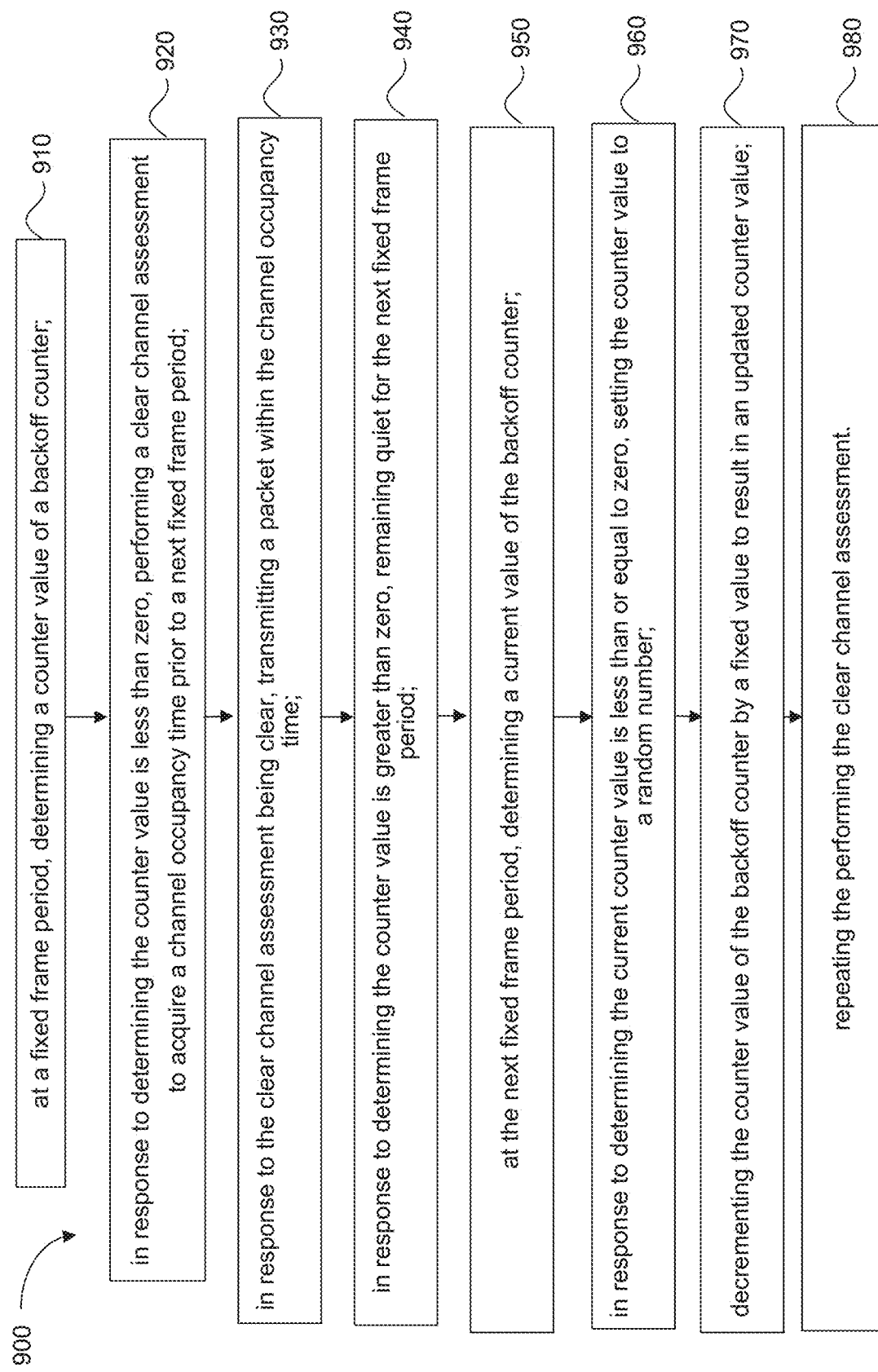
FIG. 9 illustrates another flowchart diagram of a method 900 for semi-static channel access for traffic with different priorities by a user equipment (UE) in a wireless communication system, in accordance with embodiments of the present disclosure.

FIG. 9 illustrates a flowchart diagram of a method 900 for semi-static channel access for traffic with different priorities by a user equipment (UE) in a wireless communication system. The method includes the following steps. Step 910 of the method includes the step of at a fixed frame period, determining a counter value of a backoff counter. Step 920 of the method includes the step of in response to determining the counter value is less than zero, performing a clear channel assessment to acquire a channel occupancy time prior to a next fixed frame period. Step 930 of the method includes the step of in response to the clear channel assessment being clear, transmitting a packet within the channel occupancy time. Step 940 of the method includes the step of in response to determining the counter value is greater than zero, remaining quiet for the next fixed frame period. Step 950 of the method includes the step of at the next fixed frame period, determining a current value of the backoff counter. Step 960 of the method includes the step of in response to determining the current counter value is less than or equal to zero, setting the counter value to a random number. Step 970 of the method includes the step of decrementing the counter value of the backoff counter by a fixed value to result in an updated counter value. Step 980 of the method includes the step of repeating the performing the clear channel assessment.

Figure 10:
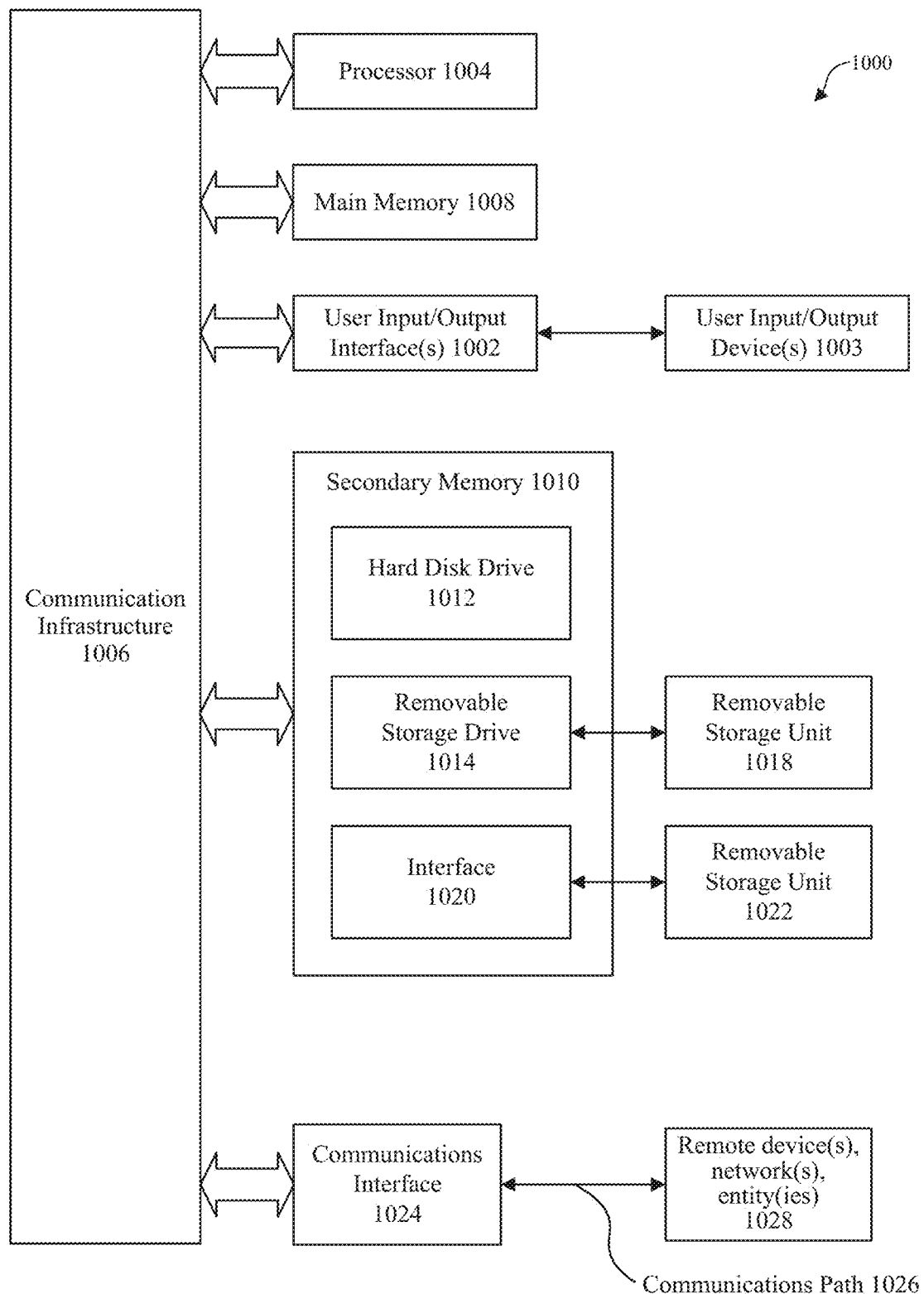
FIG. 10 is an example computer system for implementing some aspects or portion(s) thereof.

Various aspects can be implemented, for example, using one or more computer systems, such as computer system 1000 shown in FIG. 10. Computer system 1000 can be any well-known computer capable of performing the functions described herein. Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data

EXAMPLES

Example 1 may include a method for semi-static channel access for traffic with different priorities by a user equipment (UE) in a wireless communication system, the method comprising:
  performing a clear channel assessment to acquire a channel occupancy time prior to a fixed frame period;
  in response to the clear channel assessment being clear, transmitting a packet within the channel occupancy time; and
  in response to the clear channel assessment not being clear, performing a back-off procedure comprising:
    remaining quiet for a next fixed frame period;
    at the next fixed frame period, determining a counter value of a backoff counter;
    in response to determining the counter value is less than or equal to zero, setting the counter value to a random number;
    decrementing the counter value of the backoff counter by a fixed value to result in an updated counter value; and
    in response to the updated counter value being less than or equal to zero, repeat the performing the clear channel assessment.

Example 2 may include the method of example 1 or some other example herein, wherein the performing the clear channel assessment includes using a cat-2 procedure.

Example 3 may include the method of example 1 through 2 or some other example herein, wherein a duration of the channel occupancy time is within a range of 1 ms to 10 ms.

Example 4 may include the method of examples 1 through 3 or some other example herein, wherein the fixed value is based on traffic conditions.

Example 5 may include the method of examples 1 through 3, or some other example herein, wherein the fixed value is based on a number of frequency resources available to the UE.

Example 6 may include a method for semi-static channel access for traffic with different priorities by a user equipment (UE) in a wireless communication system, the method comprising:
  at a fixed frame period, determining a counter value of a backoff counter;
  in response to determining the counter value is less than zero, performing a clear channel assessment to acquire a channel occupancy time prior to a next fixed frame period;
  in response to the clear channel assessment being clear, transmitting a packet within the channel occupancy time;
  in response to determining the counter value is greater than zero, remaining quiet for the next fixed frame period;
  at the next fixed frame period, determining a current value of the backoff counter;
  in response to determining the current counter value is less than or equal to zero, setting the counter value to a random number;
  decrementing the counter value of the backoff counter by a fixed value to result in an updated counter value; and
  repeating the performing the clear channel assessment.

Example 7 may include the method of example 6 or some other example herein, wherein the performing the clear channel assessment includes using a cat-2 procedure.

Example 8 may include the method of example 6 through 7 or some other example herein, wherein a duration of the channel occupancy time is within a range of 1 ms to 10 ms.

Example 9 may include the method of examples 6 through 8 or some other example herein, wherein the fixed value is based on traffic conditions.

Example 10 may include the method of examples 6 through 8, or some other example herein, wherein the fixed value is based on a number of frequency resources available to the UE.

Example 11 may include an apparatus comprising means to perform one or more elements of a method described in or related to any of examples 1-10, or any other method or process described herein.

Example 12 may include one or more non-transitory computer-readable media comprising instructions to cause an electronic device, upon execution of the instructions by one or more processors of the electronic device, to perform one or more elements of a method described in or related to any of examples 1-10, or any other method or process described herein.

Example 13 may include an apparatus comprising logic, modules, or circuitry to perform one or more elements of a method described in or related to any of examples 1-10, or any other method or process described herein.

Example 14 may include a method, technique, or process as described in or related to any of examples 1-10, or portions or parts thereof.

Example 15 may include an apparatus comprising: one or more processors and one or more computer-readable media comprising instructions that, when executed by the one or more processors, cause the one or more processors to perform the method, techniques, or process as described in or related to any of examples 1-10, or portions thereof.

Example 16 may include a signal as described in or related to any of examples 1-10, or portions or parts thereof.

Example 17 may include a signal in a wireless network as shown and described herein.

Example 18 may include a method of communicating in a wireless network as shown and described herein.

Example 19 may include a system for providing wireless communication as shown and described herein.

Example 20 may include a device for providing wireless communication as shown and described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

What is claimed is:

1. A method, performed by a user equipment (UE), for semi-static channel access for traffic with different priorities in a wireless communication system, the method comprising:

performing a clear channel assessment to acquire a channel occupancy time prior to a fixed frame period;

in response to the clear channel assessment being clear, transmitting a packet within the channel occupancy time to a base station; and in response to the clear channel assessment not being clear, performing a back-off procedure comprising:
   determining not to transmit for a next fixed frame period;
   at the next fixed frame period, determining a counter value of a backoff counter;
   in response to determining the counter value is less than or equal to zero, setting the counter value to a random number;
   decrementing the counter value of the backoff counter by a fixed value to result in an updated counter value; and
   in response to the updated counter value being less than or equal to zero, repeating the performing the clear channel assessment, wherein configuration information for the fixed frame period is provided to the UE by RRC signaling via the base station.

2. The method of claim 1, wherein the performing the clear channel assessment comprises performing the clear channel assessment using a cat-2 procedure.

3. The method of claim 1, wherein a duration of the channel occupancy time is within a range of 1 ms to 10 ms.

4. The method of claim 1, wherein the fixed value is based on traffic conditions.

5. The method of claim 1, wherein the fixed value is based on a number of frequency resources available to the UE.

6. A user equipment (UE) comprising:
   a transceiver configured to transmit data to a network node; and
   processor circuitry configured to:
      perform a clear channel assessment to acquire a channel occupancy time prior to a fixed frame period;
      in response to the clear channel assessment being clear, transmit a packet within the channel occupancy time to a base station;
      in response to the clear channel assessment not being clear, perform a back-off procedure, wherein to perform the back-off procedure, the processor circuitry is configured to:
         determine not to transmit for a next fixed frame period;
         at the next fixed frame period, determine a counter value of a backoff counter;
         in response to determining the counter value is less than or equal to zero, set the counter value to a random number;
         decrement the counter value of the backoff counter by a fixed value to result in an updated counter value; and
         in response to the updated counter value being less than or equal to zero, repeat the performing the clear channel assessment,
      wherein configuration information for the fixed frame period is provided to the UE by RRC signaling via the base station.

7. The UE of claim 6, wherein the processor circuitry is configured to perform the clear channel assessment using a cat-2 procedure.

8. The UE of claim 6, wherein a duration of the channel occupancy time is within a range of 1 ms to 10 ms.

9. The UE of claim 6, wherein the fixed value is based on traffic conditions.

10. The UE of claim 6, wherein the fixed value is based on a number of frequency resources available to the UE.

11. A user equipment (UE) comprising:
    a transceiver configured to transmit data to a network node; and
    processor circuitry configured to:
       at a fixed frame period, determine a counter value of a backoff counter;
       in response to determining the counter value is less than zero, perform a clear channel assessment to acquire a channel occupancy time prior to a next fixed frame period;

in response to the clear channel assessment being clear, transmit a packet within the channel occupancy time to a base station;

in response to determining the counter value is greater than zero, determine not to transmit for the next fixed frame period;

at the next fixed frame period, determine a current value of the backoff counter;

in response to determining the current value of the backoff counter is less than or equal to zero, set the counter value to a random number;

decrement the counter value of the backoff counter by a fixed value to result in an updated counter value; and repeat the performing the clear channel assessment based on the updated counter value, wherein configuration information for the fixed frame period is provided to the UE by RRC signaling via the base station.

12. The UE of claim 11, wherein the processor circuitry is configured to perform the clear channel assessment using a cat-2 procedure.

13. The UE of claim 11, wherein a duration of the channel occupancy time is within a range of 1 ms to 10 ms.

14. The UE of claim 11, wherein the fixed value is based on traffic conditions.

15. The UE of claim 11, wherein the fixed value is based on a number of frequency resources available to the UE.

* * * * *